United States Patent Office 2,701,228
Patented Feb. 1, 1955

2,701,228

ISOLATION AND PURIFICATION OF PEPSIN

Kenneth W. McKerns, North York, Ontario, Canada, assignor to Canada Packers, Limited, Toronto, Ontario, Canada No Drawing. Application January 24, 1952,
Serial No. 268,141

12 Claims. (Cl. 195—66)

The present invention relates to the isolation and purification of pepsin from the stomach linings of animals.

The recovery of pepsin from the stomach linings of hogs and other animals has been practiced for a long time. The linings are first extracted with a solution of acid reaction and many acids may be employed, although hydrochloric acid enjoys the most widespread use. The separation of pepsin from the supernatant extract of the stomach mucosa has utilized several traditional methods for protein separation, such as the following:

1. Salting-out procedures with sodium chloride, magnesium sulfate, sodium sulfate, ammonium sulfate, potassium phosphate and other suitable salts used at a hydrogen ion concentration in which pepsin has minimum solubility.

2. Adsorption methods using a suitable adsorbent such as permutite, an artificial sodium aluminum, silicate, charcoal, phosphates and hydroxides of the alkaline earth metals and other metals such as copper, zinc, tin or cadmium, followed by elution of the pepsin.

3. Decrease in the ionic strength of the pepsin solution by dialysis so that the pepsin precipitates.

4. Decrease in the dielectric constant by the addition of organic solvents such as ethanol or acetone so that mucin and pepsin may be separately precipitated.

The last outlined procedure is probably the best developed to date and entails the precipitation of mucin from the digestive liquor at pH 2.5 to 3.5 with ethanol or acetone at a specific gravity of 0.94 to 0.96 at a temperature of 0° to 2.5° C. Further addition of alcohol or acetone to a specific gravity of 0.89 to 0.91 precipitates the pepsin at about pH 4.5 to 5.5. However, the best yields obtainable by the careful following of this procedure are in the neighborhood of 2.8 to 3.0% of pepsin having a proteolytic activity of 1:10,000 based on the weight of the linings digested, whereas the present procedure results in the isolation of pepsin with yields in the neighborhood of 5.0 to 5.5% on the same basis.

Accordingly, it is the primary object of the present invention to provide a process for isolating high activity pepsin in yields much higher than those heretofore obtained.

It is a further object of the present invention to provide a process for accomplishing this desired end while employing a minimum of reagents and manipulative steps.

It is a still further object of the present invention to provide a process which effects a clean-cut separation of mucin, pepsin, and mucosa proteins present in an acid extract of the stomach linings of animals.

Yet another object of the present invention is to provide a process which brings about the isolation of extremely high activity pepsin in good yields.

Other and further objects of the invention will be apparent from the following detailed description of the method employed.

This method has utilized certain of the prior art teachings, but departs radically from these teachings by altering and supplementing the various procedures heretofore known. My process comprises three essential steps as follows:

A. Acid extraction of the stomach linings of suitable animals such as the hog;

B. Precipitation and separation of mucin from the extract employing an organic solvent such as ethanol or acetone; and C. Precipitation of pepsin from the remaining extract as the zinc salt.

As will be seen later, alternative procedures may be used to isolate pepsin fractions of varying activity as desired and the mucosa proteins may be isolated separately from the pepsin.

With respect to the first step of acid extraction of the stomach linings, it has been found that a careful control of the amount and pH of acid solution used is very important in the carrying out of my process. In general, I have employed lesser amounts of solution than heretofore used and these solutions contain a smaller proportion of an acid, such as hydrochloric, so that the pH of the solution after concentration and addition of ethanol or acetone to precipitate mucin is considerably higher than heretofore contemplated. Specifically, I have found that if the solution added comprises a mixture of water of a volume representing approximately 0.65 liter of water per pound of stomach linings and a volume of concentrated (37%) hydrochloric acid in the proportion of about 15 milliliters per liter of water used, then optimum results are obtained in the practice of my invention. Using this proportion of acid solution, a pH of 4.0 to 4.2 is present at the time of mucin precipitation which, as will be set forth fully hereinafter, occurs upon reduction of the volume of the acid extract to about one-third and the addition of a suitable volume of ethanol or acetone.

The above solution at a temperature of 50° to 55° C. is mixed with ground stomach linings and the mixture is stirred sufficiently to keep the ground linings suspended. This temperature is maintained for approximately three hours after which the digest is allowed to cool slowly to room temperature and to settle for 15 to 20 hours. The supernatant liquid is then siphoned off, reduced to approximately one-third of its volume by concentration under a vacuum at a temperature of 25° to 30° C.

The extract is now ready for the second step of the present process which comprises the addition of an organic solvent such as ethanol or acetone to precipitate mucin. The extract at this time has a specific gravity of 1.15 to 1.20 at 25° C. and the concentration of the digest should not greatly exceed this limit as it would be impossible to mix ethanol or acetone therewith without effecting local concentrations sufficiently high to bring about premature precipitation and denaturation of pepsin. This is very important as any precipitation or denaturation of pepsin at this time would be directly reflected in a reduction of the final yield.

To prevent high local concentration the 95% ethanol or acetone, which has been pre-cooled to 0° to 5° C., is added slowly and with rapid mixing to the concentrated digest which has also been cooled to a comparable temperature. An amount of ethanol or acetone approximately equal to the volume of the concentrated extract is employed so that the resulting mixture is about 50 to 55% with respect to organic solvent, and as mentioned earlier the pH of the mixture formed will be found to be in the neighborhood of 4.0 to 4.2 At this pH when the mixture is allowed to stand in the cold for at least 15 hours, and if desired for as long as 60 hours, practically all of the mucin will settle to the bottom of the vessel as a compact mass leaving a clear supernatant liquid above. Only a small amount of the mucin stays on the surface of the liquid as a thin film.

With such an efficient mucin separation, the supernatant liquid is easily removed by decantation. The mucin mass is then allowed to drain on a fine wire screen or coarse cloth and then washed with a suitable volume of cold 60% solution of the organic solvent solution, followed by a final washing with a smaller amount of a cold 70% solution. The drain and washings are combined with the decanted supernatant liquid which still contains the pepsin and mucosa proteins in solution therein.

That the pH of the extract at the time of mucin separation is of extreme importance is shown by the following table:

Table I

| Run | Wt. Linings, lbs. | Vol. Acid (HCl conc.), ml. | Vol. water | pH Mucin Separation | Yield Pepsin (Percent Total as 1:10,000) |
|---|---|---|---|---|---|
| a | 16.0 | 176 | 10 l. | 3.2 | 20 |
| b | 15.5 | 160 | 10 l. | 3.9 | 50 |
| c | 15.5 | 158 | 10 l. | 4.0 | 61 |
| d | 15.5 | 158 | 10 l. | 4.2 | 68 |
| e | 15.5 | 158 | 10 l. | 4.2 | 72 |

The mucin yields were approximately the same in all runs. The pepsin yields were higher where the final pH after the separation of mucin was in the range 4.0 to 4.2. The pepsin samples were isolated as the zinc salt at pH 5.2 in accordance with the procedure which will be fully set forth hereinafter.

That the time of standing and rate of addition of organic solvent is also highly important at the mucin separation stage is shown by the following table which sets forth the results of experiments wherein the time of standing and the adequacy of solvent mixing is progressively increased.

Table II

| Run | Standing Time (hrs.) | Percent Pepsin Remaining in Supernatant |
|---|---|---|
| a | 2 | 24.0 |
| b | 16 | 85.5 |
| c | 60 | 93.8 |

It has been found that a standing time of at least 15 hours is necessary for the mixture to reach an adequate equilibrium.

Moreover, the fact that the rapidity and efficiency of mixing upon addition of organic solvent solution to the concentrated digest is very important is shown by the following table, which sets forth the results of a series of experiments wherein the efficiency of mixing was progressively better and the resulting mixture allowed to stand approximately the same length of time:

Table III

| Run | Standing Time (hrs.) | Percent Pepsin Remaining in Supernatant |
|---|---|---|
| a | 16 | 74.4 |
| b | 15 | 77.5 |
| c | 17 | 85.0 |
| d | 16 | 85.5 |

To remove any traces of mucin in the extract containing pepsin and mucosa proteins in solution, the mixture may then be filtered with a small amount of an adsorptive earth and is then ready for the third important step of the process, namely, precipitation of pepsin as the zinc salt. It has been found that a nearly quantitative precipitation results if the solution is in the neighborhood of 50 to 55% with respect to the organic solvent employed and the pH is in the region of 5.0 to 5.2. If the procedure to this point has been properly carried out, the concentration of the extract with respect to organic solvent will be within the optimum range after the washings with cold solvent solution have been added to the mixture. The method of adjusting the pH to the desired range will be set forth hereinafter.

Nearly any soluble salt of zinc may be employed as the precipitant but zinc acetate is preferred. Before adding the zinc acetate, it is dissolved in a 50% aqueous solution of ethanol or acetone so that the concentration of the extract with respect to organic solvent will not be changed by the addition. Sufficient zinc acetate is dissolved in the 50% solvent solution that the extract after addition of the solution will be within the range of 0.5 to 0.10 molar with respect to zinc acetate. The zinc acetate solution is cooled and then added very slowly with rapid mixing to the cold pepsin solution.

During this procedure the pH rises to 4.5 to 4.8 and a heavy white flocculent precipitate of a zinc pepsin complex forms. A further precipitation of pepsin can be obtained by carefully raising the pH to 5.0 to 5.2 with N sodium hydroxide solution in 50% ethanol. As before the alkali solution must be added slowly with thorough mixing to prevent the formation of local concentrations above pH 6.0 which would cause denaturation of the pepsin and precipitation of the mucosa proteins.

The zinc salt of pepsin is allowed to settle at 0° to 5° C. for 15 hours or longer and the supernatant decanted or siphoned off. The precipitate can then be compacted by filtering or centrifuging at the same temperature.

The pepsin is freed of zinc or sequestered by dissolving the zinc pepsin in an acid solution at a pH of 3.5 to 3.8. Citric, phosphoric, acetic or other acids may be used but citric acid is the preferred sequestering agent and may conveniently be employed in a solution which is 0.1 M. The pepsin solution so formed may be dried from the frozen state or vacuum dried to yield pepsin having a proteolytic activity of 1:15,000 to 1:16,000 with the yields being 5.0 to 5.5% (based on pepsin of activity 1:10,000) of the weight of the wet stomach linings initially extracted.

If pepsin of higher activity is desired, instead of drying the citrate solution, it can be diluted with an equal volume of water and reprecipitated by making the solution 20% with respect to ethanol or acetone at room temperature. The pH will be close to 4.0 and can be raised with dilute alkali to the neighborhood of 4.5. The cloudy solution is left to settle overnight at 0° to 5° C. and the precipitate recovered.

The reprecipitation of the zinc-pepsin complex may be repeated at increasingly lower pH's to produce pepsin of higher and higher activity. The yields after each reprecipitation will, of course, be correspondingly lower. The following table shows the relationship between the proteolytic activity of the product and the magnitude of the yield for each precipitation at progressively increasing acidity of the solution from which the pepsin is precipitated:

Table IV

| Precipitation | Precipitation pH | Activity | Percent Ash | Percent Zn | Recovery (Percent Initial Pepsin Present in Linings) |
|---|---|---|---|---|---|
| 1st | 5.0–5.2 | 1:15,000 | 11.2 | 8.2 | 70 |
| 2nd | 4.0–4.5 | 1:29,700 | | | 56 |
| 3rd | 2.5–3.0 | 1:40,800 | 8.3 | 2.7 | 45 |
| 4th | 2.0–2.5 | 1:54,400 | 2.8 | trace | 36 |

The precipitate in each case is brought into solution with a minimum amount of citric acid and diluted with distilled water. Ninety-five percent ethanol or acetone is added slowly with stirring in each case at room temperature and the pH adjusted. After the fourth precipitation crystallization can be attained.

If desired, the mucosa proteins remaining in the extract after removal of pepsin as the zinc salt can be precipitated by raising the pH to 6.4 to 6.5 with alkali.

The following example illustrates one specific embodiment of my invention:

One hundred pounds of ground stomach linings were added to 65 liters of low mineral content water and 0.95 liters of concentrated (37%) hydrochloric acid at a temperature of 55° C. The mixture was stirred sufficiently to keep the ground linings in suspension at all times while maintaining the tempearture at about 55° C. for three hours. The digest was then allowed to cool slowly to room temperature and to settle for 20 hours at which time the supernatant liquid was siphoned off.

The clear extract was concentrated under vacuum at a temperature of 30° C. to one-third its original volume at which time the digest had a specific gravity of 1.17 at 25° C. The extract was cooled to 5° C. and there was added slowly and with viorous stirring 28 liters of 95% ethanol pre-cooled to 5° C. The pH of the solution after the addition was found to be 4.3.

The mixture was allowed to stand in the cold for 20 hours and most of the mucin had settled to the bottom of the vessel as a compact mass with a clear supernatant above. Only a small amount of mucin was present as a surface film on the clear supernatant liquid.

The alcohol solution of pepsin and mucosa proteins was decanted from the mucin precipitate and the mucin allowed to drain on a fine wire screen. After draining the mucin was washed with 8 liters of cold 60% ethanol solution and the drain and washings were added to the previously decanted extract. The mucin was finally washed with a small amount of cold 70% ethanol and the washings were added to the pepsin-mucosa protein solution. The separated mucin was dried and stored.

The 50% ethanol solution formed by the addition of drain and washings was cooled to 0° C. and there was added thereto very slowly and with rapid mixing, a cooled solution of 700 grams of zinc acetate in 10 liters of 50% ethanol. During the mixing the pH rose to 4.6 and a heavy white flocculent precipitate comprising the zinc salt of pepsin was formed. A further precipitate of pepsin was obtained by slowly adding with rapid agitation, N sodium hydroxide in 50% ethanol until a pH of 5.1 was attained.

The precipitate of zinc pepsin was allowed to settle at 5° C. for 20 hours and the supernatant liquid was decanted. The precipitate was then compacted by centrifuging at 5° C.

The zinc pepsin precipitate was brought into solution with 14 liters of 0.1 M. citric acid at room temperature yielding a solution having a pH of 3.6. The pepsin solution so formed was then vacuum dried at 55° C. to furnish pepsin having a proteolytic activity of 1:15,000 in a yield of 5.5% of the weight of the wet linings originally digested.

To the supernatant liquid decanted from the zinc precipitate was added N sodium hydroxide until the pH reached 6.5. The higher molecular weight mucosa proteins were precipitated from solution and subsequently separated and recovered.

Thus it is seen that by the present invention I have provided a process which, with a minimum of reagents and manipulative steps has produced an excellent yield of high activity pepsin and effected a clean-cut separation of pepsin, mucin and mucosa proteins.

Having described my invention, I claim:

1. A process of isolating pepsin from the stomach linings of animals containing pepsin and mucin comprising: digesting said linings in an acid solution to form an extract containing pepsin and mucin dissolved therein and a solid residue of said linings; separating said extract from said residue; adding a sufficient amount of an organic solvent of the group consisting of ethanol and acetone to precipitate said mucin without precipitating said pepsin; separating the remainder of said extract from said precipitated mucin; and adding a sufficient amount of a soluble zinc salt to said remainder of said extract to precipitate said pepsin as a zinc pepsin complex, the pH of said remainder of said extract being adjusted to 5.0 to 5.2 at the time of adding said zinc salt.

2. The process of claim 1 wherein said soluble zinc salt comprises zinc acetate.

3. The process of claim 1 wherein said precipitate of zinc pepsin is dissolved in a solution of a sequestering agent of the group consisting of citric, phosphoric, and acetic acids and the solution dried.

4. A process of isolating pepsin from the stomach linings of animals containing pepsin and mucin, comprising: digesting said linings in an aqueous acid solution to form an extract containing pepsin and mucin dissolved therein, the amount of water in said digesting solution being in the neighborhood of .65 liters for each pound of said linings digested; separating said extract from said linings; concentrating said extract to about one-third its original volume; adding slowly with rapid mixing to precipitate said mucin, an organic solvent of the group consisting of ethanol and acetone in an amount sufficient to make the resulting mixture 50 to 55% with respect to said organic solvent, the amount of acid in said digesting solution having been sufficient to cause the pH of said resulting mixture to be within the range of 4.0 to 4.2; separating said mucin from said mixture; and adding to the remainder of said mixture a sufficient amount of a soluble zinc salt to precipitate said pepsin as a zinc pepsin complex, while adjusting said pH to approximately 5.0 to 5.2.

5. The process of claim 4 wherein said soluble zinc salt comprises zinc acetate.

6. The process of claim 5 wherein sufficient of said zinc acetate is added to make said mixture .05 to .10 molal with respect to zinc acetate.

7. The process of claim 4 wherein said precipitate of zinc pepsin is dissolved in a solution of a sequestering agent of the group consisting of citric, phosphoric and acetic acids and the solution dried.

8. In a process of isolating pepsin from a mucin-free aqueous extract containing said pepsin, the steps of adding a sufficient amount of a soluble zinc salt to said extract to precipitate said pepsin as a zinc pepsin complex while said extract is at a pH of approximately 5.0 to 5.2; dissolving said precipitate of zinc pepsin in an acid solution; reprecipitating said pepsin from said acid solution at a pH less than 5.0 by adding an organic solvent of the group consisting of ethanol and acetone, whereby there is obtained pepsin having a higher proteolytic activity than that first precipitated.

9. The process of claim 8 wherein a plurality of reprecipitations are effected at progressively lower pH's until pepsin of a desired extremely high proteolytic activity is obtained.

10. A process of isolating mucin, pepsin, and mucosa proteins from the stomach linings of animals, comprising: digesting said linings in an aqueous acid solution to form an extract containing the mucin, pepsin, and mucosa proteins dissolved therein, the amount of water in said digesting solution being in the neighborhood of .65 liters for each pound of said linings digested; separating said extract from the residue of said linings; concentrating said extract to about one-third its original volume; adding slowly with rapid mixing to precipitate said mucin, an organic solvent of the group consisting of ethanol and acetone in an amount sufficient to make the resulting mixture 50 to 55% with respect to said organic solvent, the amount of acid in said digesting solution being sufficient to cause the pH of said resulting mixture to be within the range of 4.0 to 4.2; separating said mucin from said mixture; adding to said mixture a sufficient amount of a soluble zinc salt to precipitate said pepsin as a zinc pepsin complex while adjusting said pH to approximately 5.0 to 5.2; separating said precipitate of zinc pepsin from said mixture; and raising the pH of the remainder of said mixture to 6.4 to 6.5 with alkali to precipitate said mucosa proteins.

11. A process of isolating pepsin from the stomach linings of animals containing pepsin and mucin comprising: digesting said linings in an acid solution to form an extract containing pepsin and mucin dissolved therein and a solid residue of said linings; separating said extract from said residue; adding a sufficient amount of an organic solvent of the group consisting of ethanol and acetone to said extract to precipitate said mucin at a pH of 4.0 to 4.2 without precipitating said pepsin; separating the precipitated mucin from said extract; and adding a sufficient amount of a soluble zinc salt to the remainder of said extract to precipitate said pepsin as a zinc pepsin complex.

12. A process of isolating pepsin from the stomach linings of animals containing pepsin and mucin comprising: digesting said linings in an acid solution to form an extract containing pepsin and mucin dissolved therein and a solid residue of said linings; separating said extract from said residue; adding a sufficient amount of an organic solvent of the group consisting of ethanol and acetone to said extract to precipitate said mucin without precipitating said pepsin, the amount of acid initially used in the digesting process being such that the mixture during the precipitation of said mucin is at a pH of approximately 4.0 to approximately 4.2; separating the precipitated mucin from said extract; adding a solution of zinc acetate dissolved in an organic solvent selected from the group consisting of ethanol and acetone to the remainder of said extract to precipitate said pepsin as a zinc pepsin complex; and adjusting the pH of said extract to approximately 5.0 to 5.2 during the precipitation of said pepsin.

References Cited in the file of this patent

UNITED STATES PATENTS

| | | |
|---|---|---|
| 689,149 | Weber | Dec. 17, 1901 |
| 2,305,714 | Keil | Dec. 22, 1942 |
| 2,644,784 | Kennedy et al. | July 7, 1953 |

OTHER REFERENCES

Waksman et al.: Enzymes 1926, Williams & Williams Co., page 202.